June 2, 1964  L. N. FARLEY  3,135,112
SAFETY-LOAD CONTROL OF PARALLELOGRAM TYPE OF LOAD CELL
Filed Sept. 6, 1960  2 Sheets-Sheet 1

INVENTOR.
L. Nelson Farley
BY
Edward Hathaway
Atty.

June 2, 1964     L. N. FARLEY     3,135,112
SAFETY-LOAD CONTROL OF PARALLELOGRAM TYPE OF LOAD CELL
Filed Sept. 6, 1960     2 Sheets-Sheet 2
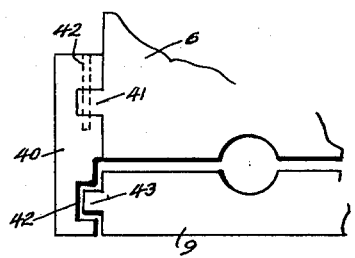
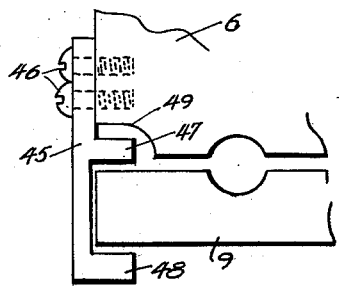
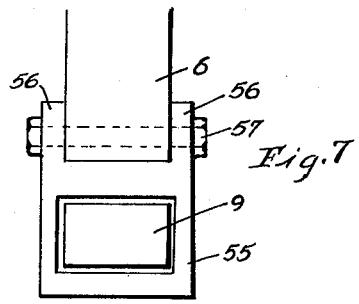
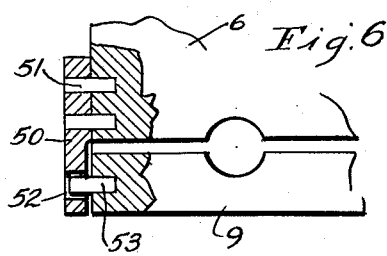
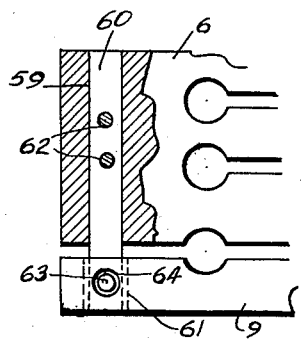
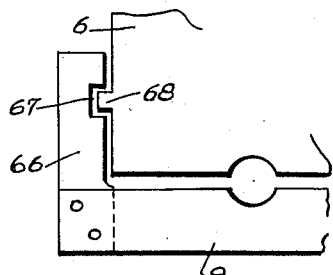
INVENTOR
L. Nelson Farley
BY
ATTORNEY 3,135,112
SAFETY-LOAD CONTROL OF PARALLELOGRAM
TYPE OF LOAD CELL
Linwood Nelson Farley, Waltham, Mass., assignor to
Baldwin-Lima-Hamilton Corporation, a corporation of
Pennsylvania
Filed Sept. 6, 1960, Ser. No. 54,091
2 Claims. (Cl. 73—141)

This invention relates to force measuring devices of the type employing a parallelogram assembly of beams which deflect in proportion to a force or load to be measured.

This device is of the general type disclosed in application of Eric Laimins, Serial No. 8,825 filed February 15, 1960, now Patent No. 3,004,231 and includes electrical strain impedance means preferably of the electrical resistance filament type bonded to a surface for determining strains induced therein by load.

It is an object of my invention to provide improved means for protecting such type of device from overloads and still allow the device to have complete freedom of movement so as to insure maximum accuracy and sensitivity.

A further object is to provide an improved overload safety arrangement for a parallelogram assembly of load sensing beams that is relatively simple in construction, operation and maintenance and is thoroughly reliable and sturdy.

Other objects and advantages will be more apparent to those skilled in the art from the following description of the accompanying drawings in which:

FIGS. 4 to 9 illustrate various modified forms of safety arrangements employing the principles of my invention.

Figure 1:
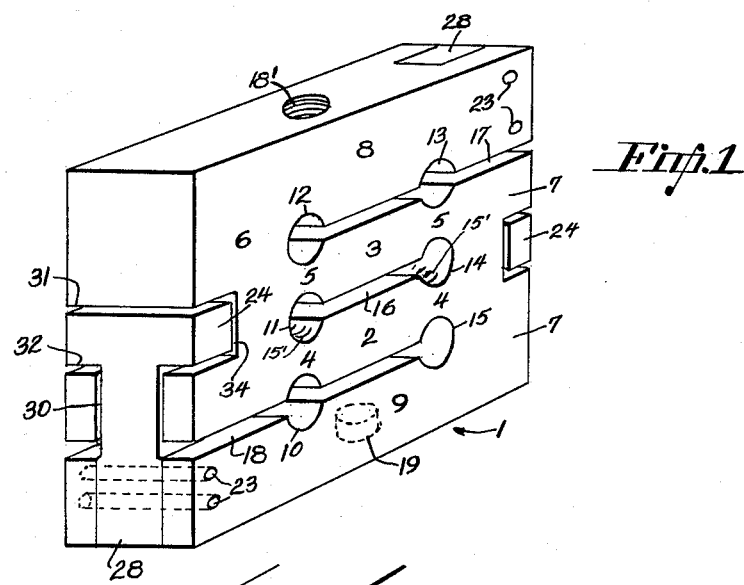
FIG. 1 is a perspective of a load sensing device of the parallelogram beam type embodying my improved overload safety mechanism.
Figure 2:
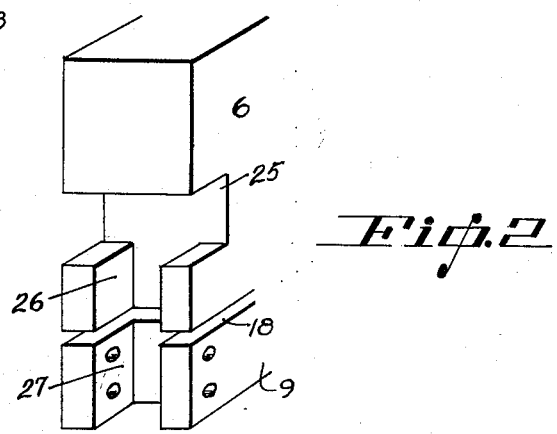
FIG. 2 is a fragmentary perspective view of one end of the load sensing device with a safety element removed.
Figure 3:
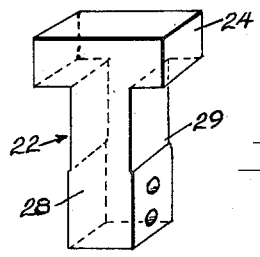
FIG. 3 is a perspective of the removed safety element by itself.

In the particular embodiment of the invention disclosed herein for the purpose of illustrating one specific form among possible others that the invention might take in practice I have shown the device as made from a solid block 1 of suitable strain responsive material such as steel, etc. having a pair of parallel beams 2 and 3 whose corresponding ends are connected by flexure sections 4 and 5 to relatively heavy inflexible end sections 6 and 7. A relatively heavy load transmitting cantilever beam 8 connected to end section 6 extends toward the end section 7 so as to overlie the parallel beams and end sections 6. All of the beams are formed by transverse holes 10–15, a short slot 16 and long slots 17 and 18 which respectively extend to the opposite ends of block 1. Electrical resistance bonded filament type strain gages 15' may be secured to the surface of the holes such as 11 and 14 to measure strain induced therein when load is applied in either tension or compression to the upper and lower beams 8 and 9 in which suitably threaded connections 18' and 19 are formed to receive load transmitting members. It is thus seen that the general form of device has relatively heavy and inflexible end sections and the upper and lower beams 8 and 9 are similarly of an inflexible nature in that they are for transmitting load to deflect the beams 2 and 3. Reference to the beams 8 and 9 "overlying" or "underlying" the beams 2 and 3 is a relative matter inasmuch as the device can be used in any position.

To prevent the beams 2 and 3 from being strained beyond a safe limit I functionally utilize the inflexible end sections and load transmitting beams by providing my improved safety stops at each end of the block 1. Inasmuch as these stops are preferably substantially identical except as to being inverted at the opposite ends it will suffice to describe only one end. A vertically extending element 22, preferably of T-shape, is connected at its lower end to the outer end of cantilever beam 9 as by suitable pins 23 while the upper T-head 24 overlies the relatively heavy inflexible end sections 6 in spaced relation thereto but is adapted to engage the end section when it has deflected a predetermined amount under tension or compression loads. More specifically, this is accomplished by providing a cross slot 25 in section 6 and a vertically aligned pair of slots 26 and 27 respectively in the lower portion of the member 6 and in the outer end of cantilever beam 9. These slots provide a T-shaped recess to receive the vertical stem 28 and T-head 24 of the element 22, the lower end of the stem 28 snugly fitting the slot 27 and the upper end of the stem being slightly cut away as at 29 to provide clearance as at 30 with the end 6 or, if desired, the stem may be straight by omitting recess 29 and then making recess 26 wide enough to provide the clearance 30. Also the T-head is slightly less in its vertical dimension than that of recess 25 thereby providing upper and lower clearances 31 and 32 with the end 6. These latter clearances are determined in accordance with the amount of safe deflection for the device. If desired, the safety element 22 may function only under tension loads and thereby rely upon the end 6 contacting the cantilever beam 9 at its outer end when subjected to compression. However, this is less desirable than having the T-head 24 function in both compression and tension because the slot 18 may then be made with less precision. The back side of the T-head 24 also has clearance 34 with the end 6. The other end of the sensing element 1 has the T-column 22 placed in an inverted position so that the outer end of the cantilever 8 is secured to the stem 28 and the T-head 24 is in the other heavy and inflexible end 7 of the device 1.

In the modifications of FIGS. 4 to 9 I provide as shown in FIG. 4 a vertical safety element 40 supported by a flange 41 protruding from the end of heavy section 6, and held thereto by a vertical pin 42. The lower end of element 40 has a recess 42 into which projects a small extension 43 of the lower beam 9. The projection 43 has clearance with the recess 42 so as to allow whatever degree of safe movement is desired between beam 9 and the rigid end section 6. In FIG. 5 a vertical element 45 is laterally secured to end section 6 by screws 46 while the lower end of element 45 has upper and lower stops 47 and 48 between which the lower beam 9 extends with suitable safety limit clearance. This arrangement only requires a relatively small recess 49 to be formed in the lower corner of the heavy end section 6. In FIG. 6 a vertical element 50 is suitably pinned as at 51 to the end section 6 while the lower end has a hole 52 into which a pin 53 extends from the lower beam 9. Again the pin 53 has suitable safety limit clearance with hole 52. In FIG. 7 a complete yoke 55 surrounds the end portion of lower beam 9 in spaced relation thereto and has ears 56 secured to the side faces of end section 6 as by a bolt 57 extending therethrough. In FIG. 8 a vertical hole 59 is drilled entirely through the end section 6 to receive a pin 60 extending down through an enlarged hole 61 in beam 9. The pin is secured to the section 6 by transverse bolts 62. A transverse safety limit pin 63 rigidly secured to pin 60 extends through an enlarged transverse hole 64 in the lever 9. This provides an extremely simple arrangement involving only the drilling of holes with no milling operations required. FIG. 9 is similar to FIG. 4 but has a vertical element 66 secured to an extended portion of the beam 9 while the upper portion has a recess 67 into which projects a small stop element 68 extending outwardly from the end section 6. Suitable clearance is provided between the element 68 and walls of recess 67 in accordance with the degree of safe movement desired.

From the foregoing disclosure it is seen that I have provided an extremely simple, rugged and effective limit stop for a parallelogram beam type of load sensing device employing broadly a vertically extending shouldered element disposed between the end section and a section of the load transmitting beam, with the shoulder normally vertically spaced from one of said sections in accordance with the degree of deflection desired to be allowed for safe operation. In accomplishing this I utilize the relatively heavy inflexible ends of the parallelogram type of device in cooperation with the relatively heavy upper and lower load transmitting cantilever beams which are paced beyond the strain sensing areas of the device.

It will, of course, be understood that various changes in details of construction and arrangement of parts may be made by those skilled in the art without departing from the spirit of the invention as set forth in the appended claims.

I claim:

1. A force measuring device comprising, in combination, a pair of substantially parallel beams having flexure elements at each end thereof, rigid sections at both ends of said beams, the flexure elements at one of the corresponding ends of the beams being connected to one of said rigid sections and the flexure elements at the other corresponding ends of the beams being connected to the other rigid section, load transmitting cantilever members positioned above and below said beams and connected respectively at one of their ends to said rigid sections while their other free ends have portions disposed respectively adjacent to portions of said rigid sections whereby the beams and cantilever members are in substantially superimposed relation so that a load force to be measured is applied to each of said cantilevers substantially normal to the direction of the superimposed relation, and load limiting means disposed between each free end of the load transmitting cantilever members and the rigid sections adjacent thereto, thereby to prevent said beams from being strained beyond a predetermined load, said combination being further characterized in that the load limiting means includes transverse slots in the rigid end sections, and a safety element secured to the end of the load transmitting cantilever members and provided with a shouldered portion extending into said slot in normally spaced relation thereto, whereby said shoulder portion engages a surface of the slot upon occurrence of said predetermined relative movement under load.

2. A force measuring device comprising, in combination, a pair of substantially parallel beams having flexure elements at each end thereof, rigid sections at both ends of said beams, the flexure elements at one of the corresponding ends of the beams being connected to one of said rigid sections and the flexure elements at the other corresponding ends of the beams being connected to the other rigid section, load transmitting cantilever members positioned above and below said beams and connected respectively at one of their ends to said rigid sections while their other free ends have portions disposed respectively adjacent to portions of said rigid sections whereby the beams and cantilever members are in substantially superimposed relation so that a load force to be measured is applied to each of said cantilevers substantially normal to the direction of the superimposed relation, and load limiting means disposed between each free end of the load transmitting cantilever members and the rigid sections adjacent thereto, thereby to prevent said beams from being strained beyond a predetermined load, said combination being further characterized in that the load limiting means includes transverse and vertical slots forming a single T-shaped slot in the rigid end sections, and a T-shaped element having its stem secured to the free end of the load transmitting cantilevers and disposed within the said T-slot in vertically spaced relation to the transverse portion thereof.

References Cited in the file of this patent

UNITED STATES PATENTS

| | | |
|---|---|---|
| 2,927,458 | Moon et al. | Mar. 8, 1960 |
| 2,981,100 | Johnson | Apr. 25, 1961 |
| 3,004,231 | Laimins | Oct. 10, 1961 |

OTHER REFERENCES

"An Adjustable-Range Force-Measuring Spring" in The Iron Age, Sept. 20, 1945, page 63.